Sept. 8, 1970      B. J. MacNORIUS      3,527,280

JOINERY INSERT

Filed Sept. 27, 1968

INVENTOR.
BRONISLAUS J. MacNORIUS
BY *Newton, Hopkins,*
*& Ormsby*
ATTORNEY

United States Patent Office 3,527,280
Patented Sept. 8, 1970

---

3,527,280
JOINERY INSERT
Bronislaus Joseph MacNorius, McComb, Miss., assignor to Croft Metal Products, Inc., McComb, Miss., a corporation of Mississippi
Filed Sept. 27, 1968, Ser. No. 763,154
Int. Cl. F16b 39/00
U.S. Cl. 151—41.75          6 Claims

ABSTRACT OF THE DISCLOSURE

The body of a joinery insert is provided with flanges at one side and cooperating ribs which present channels for receiving the opening-defining edges of a member into which the body is inserted. The body is slotted along the flanged side to allow the insert to deform and then snap into positive engagement with the member, and the slot intersects a bore along the rounded side of the body so that a screw, upon entering the bore, may deform it only so far as the slot will allow the body to spread before the member prevents further spreading. The ribs are wedge shaped to facilitate insertion of the body.

BACKGROUND OF THE INVENTION

Joinery inserts constructed of molded sythetic resinous materials and the like are used to join various structural members in abutting relation, one member being provided with an opening into which the joinery insert is inserted and the other member being provided with an opening aligned with the bore of the insert for receiving a screw fastener which, through its engagement with the bore of the insert, forces the two members into abutting relation. When forming an assembly using a plurality of such inserts, it often occurs incidental to normal handling and due to the fact that some inserts may be positioned upside down, so to speak, that one or more of the inserts may drop out or become dislodged before the screw fasteners are applied.

BRIEF SUMMARY OF THE INVENTION

The present invention provides an improved form of joinery insert wherein positive locking channels are provided between the normal positioning flanges and ribs extending along opposite side faces of the insert body. The side of the body opposite the flanges is rounded to prevent a nose for easy insertion of the body into an opening and the bore for receiving the screw fastener is offset toward and adjacent the rounded side of the body whereas the flanged side of the body is slotted into intersection with the bore so that when the body is inserted into an opening, the ribs will cam the separate portions of the body toward each other and allow the ribs to pass through the opening, whereafter the inherent resiliency of the body will cause the separate portions to snap apart and firmly lock the body to the member within which it is inserted. The slot does not allow unlimited deformation of the body when the screw fastener is inserted into the bore since the separate portions of the body formed by the slot may spread apart only to an extent as allowed by the dimensions of the opening into which the insert is received. The ribs are provided with inclined faces to provide a camming action when the body is inserted into the associated opening.

BRIEF DESCRIPTION OF THE DRAWING FIGURES

DETAILED DESCRIPTION OF THE INVENTION

Figure 1:
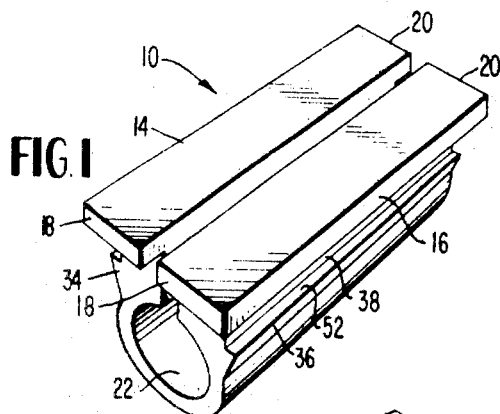
FIG. 1 is a perspective view showing an improved joinery insert according to the present invention.

In the illustrative embodiment of the invention as shown in the drawing, the joinery insert comprises an elongate body indicated generally by the reference character 10, which body is rounded along one side thereof as indicated by the reference character 12 whereas the opposite side is provided with laterally outwardly projecting flanges 14 and 16 along its outer edges and each of these flanges 14 and 16 is provided with opposite end flanges 18 and 20 coplanar and forming continuations at the opposite ends of the body with respect to the flanges 14 and 16. The end flanges 18 and 20 are of equal length so as not to require insertion of its body in any particular direction, in other words, it may be reversed.

Figure 2:
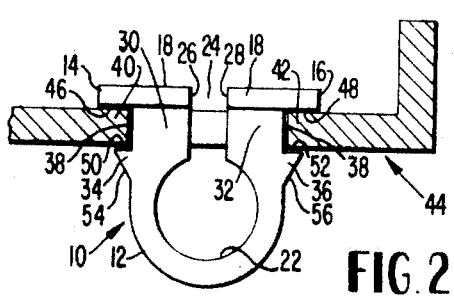
FIG. 2 is a cross sectional view showing the joinery insert engaged with a structural member.

The body 10 is provided with a longitudinal bore 22 extending between its opposite ends and offset toward the rounded side 12 of the body in close adjacency thereto, substantially as is shown in FIG. 2. The opposite side of the body is provided with a longitudinally extending slot 24 presenting spaced apart and opposed inner faces 26 and 28 normally spaced apart as shown and the slot 24 intersects the bore 22 such that the flanged side of the body is separated into two waist portions 30 and 32 between the bore 22 and the flanges 14, 16, 18 and 20.

The ribs 34 and 36 are provided along the outer sides of the waist portions 30 and 32 in spaced relationship to the flanges 14 and 16 to define longitudinally extending side channels 38 between the ribs and their respective flanges for receiving the opening-defining edge portions 40 and 42 of a structural member indicated generally by the reference character 44, see particularly FIG. 2. The flanges 14, 16, 18 and 20 provide coplanar flat surfaces 46 and 48 in opposition to the ribs 34 and 36 respectively and the ribs 34 and 36 are provided with flat faces 50 and 52 opposing the surfaces 46 and 48 so that the channels 38 are sharply defined whereby when the insert is received in the member 44 as shown in FIG. 2, it will be positively locked in engagement therewith and presents no danger of being dislodged or accidentally displaced from the opening in the member 44. The faces 54 and 56 of the ribs 34 and 36 which are on the rounded side 12 of the body 10 are sloped or inclined as shown in FIG. 2 to merge more or less smoothly with the rounded side 12 of the body so as to allow of easy insertion of the joinery insert in the member 44. In conjunction with this aspect of the invention, it will be appreciated that the rounded nose presented by the side 12 allows the insert to be very easily started in the opening whereas the inclined faces 54 and 56 of the ribs will cam the waist portions 30 and 32 toward each other and allow the ribs 34 and 36 to ride past the edges 40 and 42 until the insert snaps into place as is shown in FIG. 2.

Figure 3:
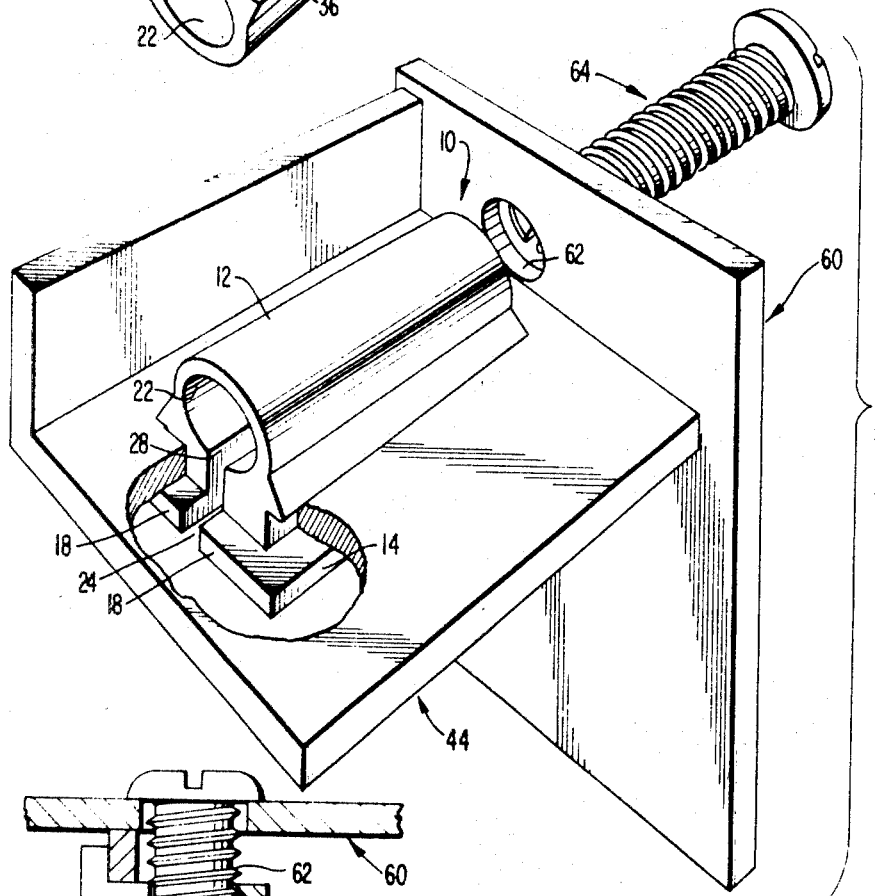
FIG. 3 is a perspective view showing two structural members to be joined together, illustrating the joinery insert associated with one of the members and the screw fastener associated with the other member.
Figure 4:
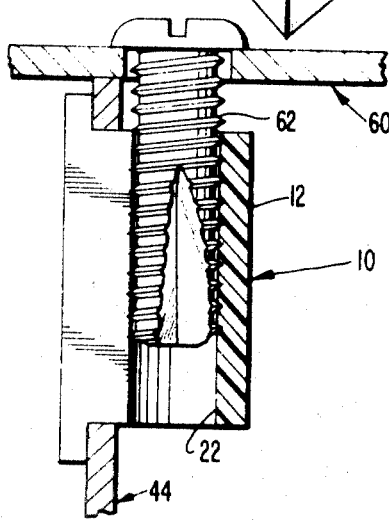
FIG. 4 is a sectional view taken through the structural members after joining thereof.

To complete the assembly of the component parts to be joined, the other structural member indicated generally by the reference character 60 in FIGS. 3 and 4 is provided with an opening 62 for receiving the screw fastener 64, such opening 62 being aligned with the bore 22 of the joinery insert body 10 and the screw fastener 62 which may be of self tapping type is driven home as is shown in FIG. 4 to complete the joining of the members 44 and 60. Once the screw fastener 62 is started in the bore 22, the body 10 is for all practical purposes a solid member inasmuch as the waist portions 30 and 32 may be spread apart only to the extent that they engage the edges 40 and 42 of the member 44, whereafter deformation of the joinery insert cannot occur. The interengagement between the component parts, then, is extremely positive and assures an effective joining of the members 44 and 60. At the same time, the insert, as has been described above, is very easily inserted and cannot fall out once having been inserted in place even though a number of the joinery inserts are utilized throughout the structural assembly of elements which ultimately are to be joined.

The present invention, therefore, is well adapted to carry out the objects and attain the ends and advantages mentioned as well as other inherent therein. While a presently illustrative embodiment of the invention is given for the purpose of disclosure, numerous changes in the details of construction and arrangement of parts may be made which will readily suggest themselves to those skilled in the art and which are encompassed within the spirit of the invention and the scope of the appended claims.

I claim:

1. A joinery insert for cooperation with a screw fastener to join a pair of structural members, said insert comprising:
   an elongate body rounded along one side thereof and having oppositely directed, laterally outwardly projecting flanges along the longitudinal outer edges of that side opposite said rounded side;
   said body having a longitudinal screw receiving bore extending between its ends offset toward and adjacent said rounded side thereof and being longitudinally split throughout its length to provide a slot along a medial region of said opposite side extending into intersection with said bore to provide separate waist portions on either side of said slot which lie between said bore and said flanges, said body having an outstanding rib extending along the outer surface of each waist portion in spaced relation to a corresponding flange to provide a channel for receiving an opening-defining edge of an associated structural member.

2. The joinery insert according to claim 1, wherein the surfaces of said ribs which face said rounded side of the body are inclined toward and into intersection with the rounded surface of such side of the body.

3. The joinery insert according to claim 2 wherein the opposing faces of said ribs and said flanges are flat and parallel.

4. The joinery insert according to claim 3 wherein the opposite ends of said body are provided with flanges coplanar with the first mentioned flanges.

5. The joinery insert according to claim 4 wherein the flanges on the opposite ends of said body are of equal length.

6. A one-piece plastic joinery insert for cooperation with a screw fastener to join a pair of structural members, one of which defines an aperture therethrough, comprising:
   an elongate body constructed and arranged for lateral passage through the aperture in the structural member rounded along one side thereof and defining a longitudinally extending screw receiving bore therethrough adjacent to and coaxially located with respect to said rounded side for threaded receipt of the fastener therein;
   an outwardly directed flange integral with said body along that side opposite said rounded side and extending around said body to define a bearing surface for locating said body within the aperture when said rounded side is inserted through the aperture, said flange having a width such that said flange will not pass through said aperture;
   said body and said flange defining a longitudinally extending slot therethrough opening into said bore at one thereof, opening onto the ends of said body at opposite edges thereof, and opening onto that side of said body adjacent which said flange is located, said slot located centrally of said body and having a width less than the diameter of said bore, and
   an outwardly projecting rib extending longitudinally along each of the opposite sides of said body, integral therewith, and having a triangular cross-section to provide a locking surface parallel to said bearing surface of said flange and spaced thereabove to define a recess for a receipt of the structural member adjacent said aperture to fix said insert in said aperture, that side of said rib facing said rounded edge of said body being inclined for contracting said slot as said insert is positioned in said aperture to allow said insert to be received in said aperture,
   the resiliency of said body being sufficient to allow said screw fastener to engage said body about said bore and force said body apart to firmly lock same in position in said aperture.

References Cited

UNITED STATES PATENTS

| | | | |
|---|---|---|---|
| 2,040,374 | 5/1936 | Grimes. | |
| 2,836,214 | 5/1958 | Rapata | 85—80 |
| 2,883,228 | 4/1959 | Roberts | 151—41.75 |
| 3,106,994 | 10/1963 | Scott | 151—41.75 |
| 3,110,338 | 11/1963 | Rapata | 151—41.75 |
| 3,141,489 | 7/1964 | Rapata | 85—80 |
| 3,341,903 | 9/1967 | Buntic | 85—80 |

FOREIGN PATENTS 1,381,705  11/1964  France.

MARION PARSONS, Jr., Primary Examiner

U.S. Cl. X.R.

85—80; 287—189.36